United States Patent
Krüger et al.

(10) Patent No.: US 7,626,706 B2
(45) Date of Patent: Dec. 1, 2009

(54) POLARIZATION INTERFERENCE MICROSCOPE

(75) Inventors: Ralf Krüger, Butzbach/Griedel (DE); Christian Schulz, Solms/Albshausen (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 358 days.

(21) Appl. No.: 11/733,466

(22) Filed: Apr. 10, 2007

(65) Prior Publication Data
US 2007/0247635 A1   Oct. 25, 2007

(30) Foreign Application Priority Data
Apr. 11, 2006  (DE) .................. 10 2006 017 327

(51) Int. Cl.
*G01B 11/02* (2006.01)
(52) U.S. Cl. ..................................... 356/495
(58) Field of Classification Search ................. 356/453, 356/495
See application file for complete search history.

(56) References Cited

U.S. PATENT DOCUMENTS

| | | | |
|---|---|---|---|
| 2,601,175 A | 6/1952 | Smith | |
| 3,868,168 A | 2/1975 | De Veer | |
| 5,764,363 A | 6/1998 | Ooki et al. | |
| 6,128,127 A | 10/2000 | Kusaka | |
| 6,519,040 B1 | 2/2003 | Amos | |
| 6,853,455 B1* | 2/2005 | Dixon et al. | 356/453 |
| 7,046,436 B2 | 5/2006 | Danz et al. | |
| 2003/0030817 A1* | 2/2003 | Lee et al. | 356/491 |

FOREIGN PATENT DOCUMENTS

| | | |
|---|---|---|
| DE | 2 401 973 | 7/1974 |
| DE | 196 26 261 A1 | 1/1997 |
| EP | 1 359 453 B1 | 11/2003 |
| JP | 10-161031 A | 6/1998 |

* cited by examiner

Primary Examiner—Patrick J Connolly
(74) Attorney, Agent, or Firm—Foley & Lardner LLP (57) ABSTRACT

The present invention relates to a polarization interference microscope (1) for imaging objects (5). The polarization interference microscope (1) comprises a light source (2), an illumination beam path (6), an imaging beam path (7) and an objective (4). The illumination beam path (6) extends from the light source (2) to the object (5). The imaging beam path (7) extends from the object (5) to a detector or a tube (3). At least one polarization means (9) is provided in the illumination beam path (6) and/or in the imaging beam path (7), by which at least one polarization means the light of the respective beam path (6, 7) can be converted into a predeterminable polarization state. An analyzer means (10) is provided in the imaging beam path (7). A birefringent component is provided between the polarization means (9) and the analyzer means (10), by which birefringent component the light polarized by the polarization means (9) can be divided into two partial beams (13, 14) having different polarization directions. The component can produce a splitting between the two partial beams (13, 14). The present invention furthermore relates to a retrofit kit for a conventional microscope and for a conventional polarization interference microscope, respectively, and a method for imaging objects. In order to enable variable contrasting of the interference contrast, the polarization interference microscope (1) according to the invention is characterized by the fact that the component has a liquid crystal element (11, 21, 23) formed in such a way that the value of the splitting between the two partial beams (13, 14) is settable in a variable manner thereby.

33 Claims, 6 Drawing Sheets

POLARIZATION INTERFERENCE MICROSCOPE

CROSS-REFERENCE TO RELATED PATENT APPLICATIONS

The right of foreign priority is claimed under 35 U.S.C. § 119(a) based on Federal Republic of Germany Application No. 10 2006 017 327.9, filed Apr. 11, 2006, the entire contents of which, including the specification, drawings, claims and abstract, are incorporated herein by reference.

BACKGROUND OF THE INVENTION

The present invention relates to a polarization interference microscope for imaging objects. The polarization interference microscope comprises a light source, an illumination beam path, an imaging beam path and an objective. The objective is part of the imaging beam path and may be part of the illumination beam path. The illumination beam path extends from the light source to the object. The imaging beam path extends from the object to a detector or a tube. At least one polarization means is provided in the illumination beam path and/or in the imaging beam path, by which at least one polarization means the light of the respective beam path can be converted into a predeterminable polarization state. An analyzer means is provided in the imaging beam path. A birefringent component is provided between the polarization means and the analyzer means, by which birefringent component the light polarized by the polarization means can be divided into two partial beams having different polarization directions. The component can produce a splitting between the two partial beams. The present invention furthermore relates to a retrofit kit for a conventional microscope and for a conventional polarization interference microscope, respectively, and to a method for imaging objects.

The microscopic examination of objects involves the use of various types of microscopes which are suitable for the respective purpose of application. To examine colourless, transparent and usually very thin objects by means of transmitted light, it is possible to use microscopes which operate according to the interference contrast method. In principle, in microscopes of this type, thickness or height differences in the object are represented by the phase of a plane wave being modulated by the object structure. This modulated wave is then brought to interference with an uninfluenced reference beam. The resultant pattern permits the quantitative determination of phase or path differences in the object. The path differences can also be converted into a plastic or colour-contrasted image in this method.

Alongside the possibility of forming an image from the interference between the modulated wave and an uninfluenced reference beam, there is also the possibility of producing an image with so-called differential interference contrast (DIC). Height differences and material-dependent phase variations at the surface of the object can be represented with high contrast by this method. Contrary to the interference contrast method, in the differential interference contrast method, the modulated wave is not brought to interference with an uninfluenced reference beam, but rather with a laterally offset phase-modulated object wave itself. Therefore, in the differential interference contrast method, the difference values at adjacent object points influence the image generation. Consequently, only those get details are made visible in the immediate vicinity of which there is a refractive index or thickness gradient which can be represented sufficiently by an interference of adjacent waves. Differential interference contrast microscopes usually have, alongside a linear polarizer and an analyzer, at least one wollaston prism by which a splitting and, if appropriate, a recombination of the waves or partial beams is realised.

A microscope that utilizes differential interference contrast mentioned above is known for example from DE 2 401 973 and U.S. Pat. No. 2,601,175. In this case, a condenser prism splits linearly the polarized light into two partial beams which are polarized perpendicular to one another and which are offset parallel to one another. The two partial beams correspondingly pass through the object at different locations and are combined again with the aid of an objective prism arranged downstream of the object. An analyzer arranged subsequently in the beam path brings the two partial beams to interference. Differences in the optical path length which are attributable to height differences or material-dependent phase variations can be converted into intensity differences in this way. A sharp image of the object can then be generated with the aid of said intensity differences.

In principle, this method can also be carried out without the condenser prism. However, the condenser prism is necessary in order to be able to generate a brilliant image, the condenser prism acting as a so-called compensation prism which can be used to compensate for path difference differences of the objective prism on account of the two prism parts.

Contrasting that can be set in a variable manner is not possible, however, with the microscopic imaging methods mentioned above. Such contrasting could be obtained at best by exchanging the prisms provided in the microscope. However, such prisms, as crystal-optical components, are very expensive.

Thus, JP 10161031 A, for example, discloses a variable differential interference contrast in which two wedge-shaped double plates can be displaced with respect to one another for a contrast variation in each on the illumination side and the imaging side. Firstly, this arrangement is extremely complex from a constructional standpoint. Secondly, the splitting elements provided there are situated in a plane conjugate to the object, with the result that, relative to the configurations which are usually used and in which the splitting elements are provided in a pupil plane, for example, additional optical elements are situated between crossed polarizers, which can have a contrast-reducing effect as a result of strains, contaminations and refractions at curved surfaces.

SUMMARY OF THE INVENTION

Therefore, the present invention is based on the object of specifying and developing a polarization interference microscope of the type mentioned in the introduction in which a variable contrasting is possible, wherein the disadvantages mentioned above are intended to be largely avoided. Furthermore, the present invention is based on the object of providing a retrofit kit for a conventional microscope and for a conventional polarization interference microscope, respectively, and a method for imaging objects by which a variable contrasting is likewise made possible.

The polarization interference microscope of the type mentioned in the introduction which is claimed according to the invention achieves the above object by means of the features described herein. Accordingly, such a polarization interference microscope is characterized by the fact that the component has a liquid crystal element formed in such a way that the splitting between the two partial beams can be set in a variable manner thereby.

In conventional differential interference contrast, in which at least one component in the form of a Savart double plate is usually used in microscopy, said Savart double plate, on the basis of its birefringent properties, splits the linearly polarized light into two partial beams which are polarized perpendicularly to one another and which are offset parallel to one another, if the Savart double plate is arranged in an intermediate image plane of the microscope.

A further customary design for a microscope with conventional differential interference contrast uses a wollaston prism in proximity to a pupil plane at the microscope, which prism, on the basis of its birefringent properties, splits the linearly polarized light into two partial beams which are polarized perpendicular to one another and which have an angular divergence. The contrasting during the imaging of objects is directly related to the splitting of the two partial beams. Said splitting is directly dependent on the properties of the Savart double plate and the wollaston prism, respectively, which are not variable. Therefore, variable contrasting in differential interference contrast is not possible thereby. A partial beam in the sense of the present invention should be understood to mean, in particular, the totality of all the light rays which is split into a linearly polarized portion by the liquid crystal element. Consequently, such light rays are present over the entire cross-sectional area of the liquid crystal element that is effective in the beam path.

In the manner according to the invention, therefore, provision is made for using a birefringent component having variable properties in the splitting of the polarized light into two partial beams having different linear polarization directions. For this purpose, the component has a liquid crystal element by which the splitting between the two partial beams can be set in a variable manner, the liquid crystal element itself having a birefringent property. In principle, the liquid crystal element, the splitting can be produced either by means of a variable angular splitting or by means of a variably settable parallel offset of the two partial beams. This will be discussed in greater detail below.

The liquid crystal element can be set in a variable manner. Thus, the liquid crystal element could be able to be set in a variable manner on the basis of magneto-optical or electro-optical properties, for example. A liquid crystal element that is settable electro-optically is preferably used. By applying a suitable electrical voltage to the liquid crystal element, the liquid crystals of the liquid crystal element can be deflected from their rest position, the deflection of the liquid crystals being effected in a manner dependent on the applied voltage. The splitting of the partial beams can therefore be influenced or varied in a manner dependent on the respective value of the defection of the liquid crystals.

In accordance with one preferred embodiment, the liquid crystal element is arranged in the beam path and/or formed in such a way that the partial beams divided by the liquid crystal element form an angle. In other words a splitting into two mutually divergent partial beams can be effected by means of the liquid crystal element. In a microscope, a liquid crystal element formed in this way would expediently be arranged in a pupil plane in the beam path. This angular splitting is converted into a lateral splitting or into a parallel offset by a condenser or objective disposed downstream in the beam path.

In an alternative embodiment, the liquid crystal element could be arranged in the beam path and/or formed in such a way that the partial beams divided by the liquid crystal element have a parallel offset. A liquid crystal element formed in this way could be arranged in the beam path of a microscope in an intermediate image plane.

The polarization directions of the partial beams divided by the liquid crystal element are preferably oriented substantially perpendicular to one another. Accordingly, the liquid crystal element should be formed in a suitable manner and be arranged at a corresponding location in the beam path and be illuminated with polarized light having a suitable polarization state.

In an especially preferred embodiment, the polarization means and the liquid crystal element are arranged relative to one another in the beam path in such a way that the oscillation direction of the light linearly or circularly polarized by the polarization means is oriented substantially parallel to the angle bisector of the polarization directions of the partial beams that can be generated by the liquid crystal element. If, therefore, the partial beams divided by the liquid crystal element have polarization directions which are oriented substantially perpendicular to one another, the oscillation direction of the light linearly polarized by the polarization means is in each case oriented 45 degrees with respect to the polarization direction of a partial beam. As a result of this, the light passing through the liquid crystal element is divided into the two partial beams in equal intensity parts.

A possible construction or a possible embodiment of the liquid crystal element and the method of operation thereof are discussed below. The liquid crystal element has a substantially parallelepipedal or cylindrical volume arranged between two glass plates in which volume liquid crystals are provided. An electrode is provided between one glass plate and the liquid crystal volume, which electrode could have an optically transparent, electrically conductive layer. A further electrode is provided between the other glass plate and the liquid crystal volume. The electrode preferably has an ITO layer, where the abbreviation ITO stands for indium tin oxide. At least one ITO layer can be electrically contact-connected. One ITO layer could have a high electrical resistance and the other ITO layer could have a low electrical resistance. It is also conceivable for both ITO layers to have a low electrical resistance. Between an ITO layer and the liquid crystal volume, a layer is provided by which a preorientation of the liquid crystals can be produced. The layer preferably has polyimide. With regard to further details of a liquid crystal element formed in this way, reference is made to the description of the figures, where the electrical contact-connection and the functioning will also be discussed in further detail.

It is furthermore conceivable for a plurality of liquid crystal elements which are arranged one alongside another or one behind another and can be driven in each case independently of one another and/or individually to be provided. Thus, a series or a matrix of individual liquid crystal elements, for example, could be provided as the component. The individual liquid crystal elements are preferably arranged transversely with respect to the optical axis, so that each individual liquid crystal element acts on a different part of the cross section of the beam path. It would also be conceivable for two or more liquid crystal elements to be arranged one behind another along the optical axis. Each of the individual liquid crystal elements could be configured such that they can be driven electrically, with the result that a virtually arbitrary distribution of the phase differences or of the splitting of the respective resultant split partial beams that can be produced thereby can be produced with the series or the matrix of the liquid crystal elements over the effective beam cross section of the beam path.

It could be provided that the splitting that can be produced by the liquid crystal element is substantially constant over its entire cross-sectional area effective in the beam path or the diameter of the beam path. If the liquid crystal element is operated by means of electro-optical driving, for this purpose a constant voltage would have to be applied to the entire cross-sectional area of the liquid crystal element that is effective in the beam path.

The liquid crystal element is preferably driven in such a way that the phase difference that can be produced by the liquid crystal element has values which are different in a predeterminable manner depending on the spatial coordinate of the cross-sectional area effective in the beam path. With this measure, by way of example, the values of the phase difference that can be produced by the liquid crystal element depend, at least along one direction, proportionally, that is to say linearly, on the spatial coordinate of the cross-sectional area effective in the beam path and an angular splitting of the two partial beams may result from this. A potential, exponential, trigonometric, logarithmic or some other dependence on the spatial coordinate in the beam path could also be realized instead of a linear dependence. This would presuppose that a corresponding voltage profile can be applied to the liquid crystal element with correspondingly equipped electrodes if the liquid crystal element is driven on the basis of electro-optical properties.

The polarization means could be arranged in the illumination beam path between the light source and the objective. The polarization means preferably has a linear or circular polarization filter. Such an arrangement of the polarization means is comparable with the arrangement in a conventional differential interference contrast microscope. It is also conceivable for the polarization means to be arranged in the imaging beam path between the objective and the liquid crystal element. Such an arrangement of the polarization means could be used for example when a microscopic beam path is provided, as proposed in EP 1 359 453 A2, for example, where the polarization means is only provided in the imaging beam path, with the result that optically anisotropic carrier materials and/or an objective or condenser exhibiting residual stress does not adversely influence the polarization-optical contrast method. In other words, in that case the object is illuminated with non-polarized light or imaged by the objective. A circular polarization filter comprises a linear polarizer with a $\lambda/4$ plate disposed downstream thereof. The light passing through the linear polarizer is linearly polarized by the linear polarizer and the linearly polarized light is converted to circularly polarized light by the $\lambda/4$ plate.

The analyzer means could be arranged in the imaging beam path between the objective and a detector and/or a tube and could likewise have a linear or circular polarization filter. The partial beams can then attain interference there and generate the contrasted image of the object. The circular polarization filter in the analyzer means comprises a $\lambda/4$ plate with a linear polarizer disposed downstream thereof. The $\lambda/4$ plate converts the circularly polarized light to linearly polarized light. Only light having an oscillation component oriented parallel to the linear polarization direction of the linear polarizer can pass through the linear polarizer.

In the case of a reflected light illumination, the liquid crystal element is preferably arranged in the illumination beam path between the polarization means and the objective. In the case of a transmitted light illumination, the liquid crystal element is arranged in the illumination beam path between the polarization means and a condenser. Accordingly, the liquid crystal element in the case of these microscopic illumination types could be arranged where the first wollaston prism disposed downstream of the light source is usually arranged in a conventional differential interference contrast microscope.

In one preferred embodiment, the liquid crystal element is only arranged in the imaging beam path between the objective and the analyzer means. This could be provided for example in the case of a reflected light illumination or in the case of a transmitted light illumination where the polarization means is also arranged in the imaging beam path in a manner comparable to EP 1 359 453 A2.

In a further embodiment, a liquid crystal element is arranged in the illumination beam path and a further liquid crystal element is arranged in the imaging beam path. Such an arrangement of two liquid crystal elements is expedient in the case of a transmitted light illumination, in particular, in which the liquid crystal element arranged in the illumination beam path acts in a manner comparable to a condenser prism in differential interference contrast microscopy. The liquid crystal element arranged in the imaging beam path accordingly acts in a manner comparable to the objective prism.

In an especially preferred embodiment, a compensation element having a birefringent property is provided, which compensation element may have liquid crystals. In principle, the compensation element is optionally used. Essentially two effects can be compensated for by means of such a compensation element. Thus, firstly, it is possible to compensate for the dispersion of the birefringence that is produced by the liquid crystal element. This is because liquid crystals usually exhibit great dispersion of the birefringence. The difference in refractive index between the ordinarily and extraordinarily polarized component thus varies with the light wavelength. Accordingly, the path difference of the two partial beams that can be produced by the liquid crystal element would likewise vary with the wavelength. If a compensation element is used, therefore, it is possible—presupposing a suitable arrangement/formation of the liquid crystal element and the compensation element—for both partial beams to cover the same optical path distance as ordinary and extraordinary beam. The path difference between the two partial beams thus vanishes for all wavelengths. Secondly, the compensation element can set an additional path difference possibly provided between the two partial beams in such a way that, by way of example, after passing through the liquid crystal element and through the compensation element, the recombined partial beams no longer have a path difference on the optical axis or in the center of the effective beam cross section. Consequently, the compensation element is arranged in the beam path of the polarization interference microscope and can be operated in such a way that a dispersion difference between the partial beams that is brought about by the liquid crystal element can largely be compensated for by the compensation element and/or that a predeterminable offset can be produced by the compensation element with regard to the phase difference of the partial beams.

The compensation element could be formed or be able to be operated in such a way that the phase difference produced by the compensation element between two partial beams on the optical axis can be minimized or has a value of zero. As a result of this, these two beams have a maximal interference capability.

Like the liquid crystal element as well, the compensation element could be settable in a variable manner on the basis of magneto-optical or electro-optical properties. Accordingly, both the liquid crystal element and the compensation element could be settable electrically in a variable manner. For this purpose, provision could be made of a corresponding control apparatus or electronic drive unit having two output stages for a respective element.

The phase difference that can be produced by the compensation element could be essentially constant over its entire cross-sectional area effective in the beam path. It could also be expedient for the phase difference that can be produced by the compensation element to have values which are different in a predeterminable manner depending on the spatial coordinate of the cross-sectional area effective in the beam path. In this respect, both the compensation element and the liquid crystal element could have comparable effects, both elements preferably being arranged and operated relative to one another in such a way that it is thereby possible to obtain an optimum variability in the contrasting in conjunction with an optimum quality of the object imaging.

In one preferred embodiment, the compensation element is arranged between the liquid crystal element and the analyzer means. This compensates for dispersion effects caused by the liquid crystal element at a location in the beam path which lies upstream of the analyzer means, with the result that the partial beams that have been compensated in this regard, interfere with one another at the analyzer means. In principle, the compensation element could also be arranged at any desired location between the polarization means and the analyzer means. This will depend on the respective application which is to be carried out with the polarization interference microscope according to the invention.

Preferably, the compensation element is arranged relative to the liquid crystal element in the beam path in such a way that the ordinary axis of the compensation element is at a predeterminable angle with respect to the ordinary axis of the liquid crystal element. Said angle could substantially be at 90 degrees. In other words, the liquid crystal element is then rotated with regard to its birefringent properties by 90 degrees relative to the compensation element and the birefringent properties thereof in the beam path.

Especially preferably, the polarization interference microscope according to the invention has a reflected light illumination beam path and/or a bright field illumination of the object. In other words, the object illumination is effected from one direction and the object imaging is effected in the opposite direction. Both the object illumination and the object imaging are correspondingly effected through the objective.

The polarization interference microscope according to the invention could also have a transmitted light illumination beam path. If a polarization interference microscope has a beam path which is comparable with the beam path disclosed in EP 1 359 453 A2, a slit diaphragm could be arranged in the illumination beam path.

In polarization interference microscopy, a wide field imaging of the objects is usually realized, that is to say that an imaging method that effects extensive imaging is involved.

With regard to a retrofit kit for a microscope, the object mentioned in the introduction is achieved by means of the features described herein. Accordingly, a retrofit kit comprises a polarization means, an analyzer means, a liquid crystal element and, if appropriate, a compensation element. The polarization means, the analyzer means, the liquid crystal element and, if appropriate, the compensation element are introduced into the beam path of the microscope in such a way that a polarization interference microscope can be formed as a result. With such a retrofit kit, in an especially advantageous manner, a conventional microscope can be converted to a polarization interference microscope according to the invention, to be precise even when the respective conventional microscope or device has already been installed for an end user for a long time. The only prerequisite for this is, however, that the respective device has corresponding incorporation or insertion possibilities into which the respective optical components can be introduced into the beam path, the respective components (polarization means, analyzer means, liquid crystal element and, if appropriate, the compensation element) being arranged in corresponding compatible mounts or in components formed complementarily with respect to the incorporation or insertion possibilities.

The object mentioned in the introduction can be achieved in a comparable manner with regard to a retrofit kit for a conventional polarization interference microscope by means of the features described herein. Accordingly, a retrofit kit for a conventional polarization interference microscope has a liquid crystal element, and, if appropriate, a compensation element. The liquid crystal element and, if appropriate, the compensation element can be introduced, instead of at least one wollaston prism of the conventional interference microscope, into the beam path of the microscope in such a way that a polarization interference microscope can be formed as a result.

From a method standpoint, the object mentioned in the introduction is achieved by means of the method according to the invention for imaging objects with a polarization interference microscope. The polarization interference microscope comprises a light source, an illumination beam path, an imaging beam path and an objective. The illumination beam path extends from the light source to the object. The imaging beam path extends from the object to a detector or a tube. At least one polarization means arranged in the illumination beam path and/or in the imaging beam path converts the light of the respective beam path into a predeterminable polarization state. An analyzer means is provided in the imaging beam path. A birefringent component is provided between the polarization means and the analyzer means, by which birefringent component a light polarized linearly by the polarization means is divided into two partial beams having different polarization directions and by which birefringent component a splitting between the two partial beams is produced. The component has a liquid crystal element formed in such a way that the splitting between the two partial beams can be set in a variable manner thereby.

With the spatial splitting into two partial beams, the two partial beams cover a different optical distance. Therefore, in particular a phase difference between the two partial beams is produced as a result. On account of the splitting of the two partial beams that is settable in a variable manner, it is thus possible to alter the value of the phase difference between the two partial beams.

The imaging method according to the invention is especially preferably carried out with a polarization interference microscope and/or on a polarization microscope upgraded or converted, such that, in order to avoid repetition concerning the apparatus features in this regard, reference is made to the previous part of the description, the method steps necessary for this purpose being deduced by a skilled worker active in the present field with knowledge of the disclosure content of the previous part of the description.

There are various possibilities, then, for advantageously configuring and developing the teaching of the present invention. In general, the preferred configurations and developments of the teaching are also explained in conjunction with the explanation of the preferred exemplary embodiments of the invention with reference to the drawing.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

DETAILED DESCRIPTION OF THE PREFERRED EMBODIMENTS

Figure 1:
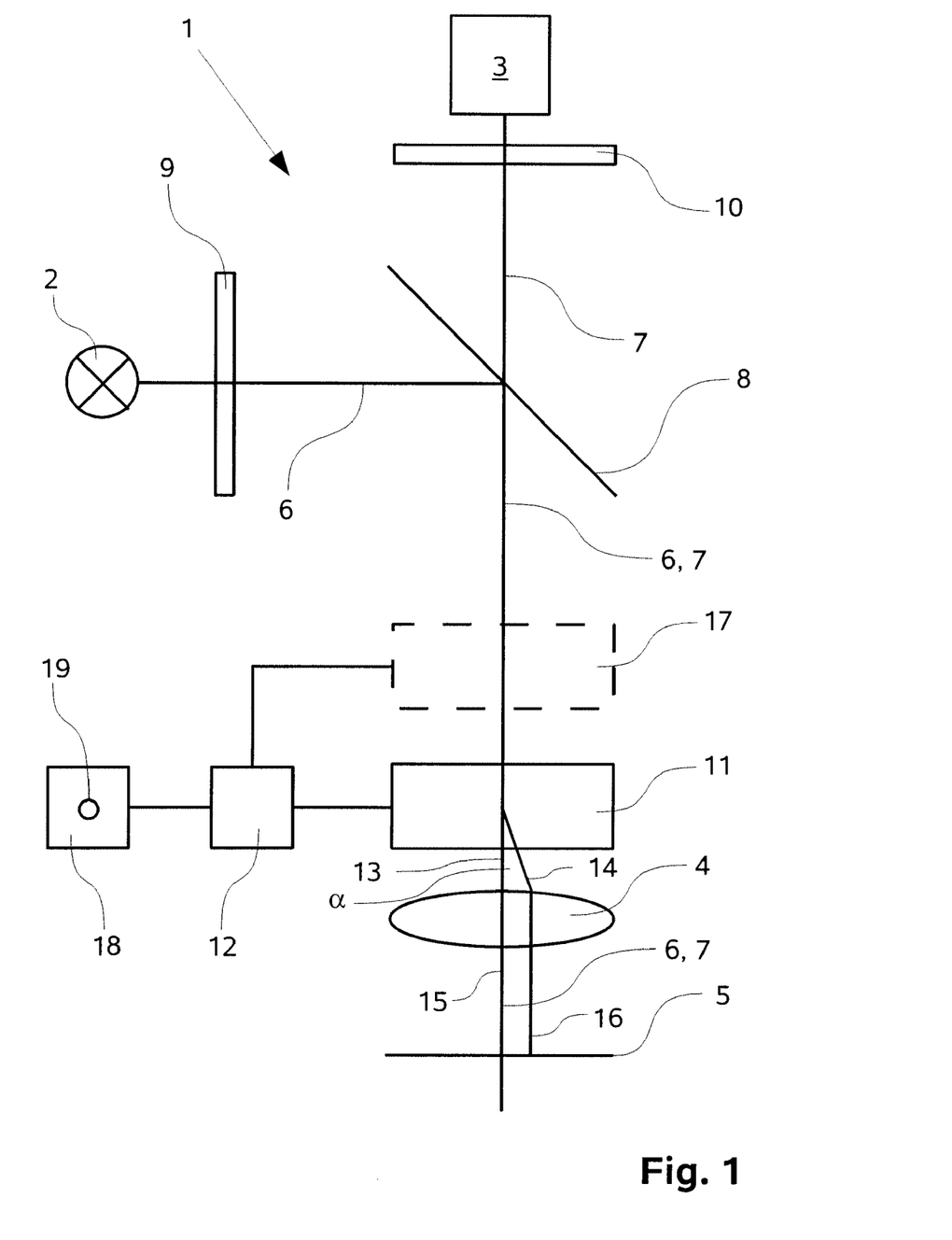
FIG. 1 shows a schematic illustration of a first exemplary embodiment of a polarization interference microscope according to the invention.

In the figures, identical or similar components are identified by the same reference symbols. FIG. 1 shows a first exemplary embodiment of a polarization interference microscope 1 according to the invention. The polarization interference microscope 1 comprises a light source 2 (e.g. a conventional white light source) and a schematically indicated detector (e.g. a CCD camera) or a tube lens 3. The imaged object can also be observed through the schematically indicated tube lens 3, so that strictly speaking the imaging beam path extends right into the operator's eye.

The polarization interference microscope 1 furthermore comprises an objective 4. The object plane of the polarization interference microscope 1 is indicated by the reference symbol 5, the object (usually on an object carrier) being positioned at said plane. For the sake of simplicity, the object to be imaged is also identified by the reference symbol 5 hereinafter. Consequently, the illumination beam path 6 extends from the light source 2 as far as the object 5. The imaging beam path 7 extends from the object 5 as far as the tube lens 3 or as far as an operator's eye—not shown in FIG. 1. The light or illumination light from the light source 2 is reflected at the beam splitter 8 in the direction of the objective 4 and the object 5. The illumination light reflected at the object 5 is at least partly imaged by the objective 4 in the direction of the tube lens 3 and at least for the most part passes through the beam splitter 8 in the process, said beam splitter having a suitable transmission or reflection ratio. By way of example, that surface of the beam splitter 8 which faces the light source 2 could have a reflection coefficient of 0.4, with the result that only 40% of the light from the light source 2 is reflected by the beam splitter 8 in the direction of the object 5. Likewise 40% of the light reflected at the object 5 is then reflected in the direction of the light source 2; however, the reaming portion of approximately 60% of the light reflected by the object 5 can then pass through the beam splitter 8 in the direction of detector or tube lens 3. The exemplary embodiment in accordance with FIG. 1 correspondingly involves a reflected light illumination beam path, both a part of the illumination beam path 6 and a part of the imaging beam path 7 extending between the object 5 and the beam splitter 8.

The polarization means 9 is arranged in the illumination beam path 6 and between the light source 2 and the beam splitter 8, by which polarization means the light from the light source 2 is linearly polarized in a predeterminable polarization direction. The analyzer means 10 is arranged in the imaging beam path 7 and between the beam splitter 8 and the tube lens 3. The analyzer means 10, like the polarization means 9, is likewise a linear polarization filter, the polarization means 9 being arranged relative to the analyzer means 10 in such a way that their polarization directions are oriented substantially perpendicular to one another (crossed orientation).

A birefringent component 11 is provided between the polarization means 9 and the analyzer means 10 by which birefringent component the light linearly polarized by the polarization means 9 can be divided into two partial beams 13, 14 having different polarization directions. The component 11 can produce a splitting between the two divided partial beams 13, 14.

According to the invention, the component 11 has a liquid crystal element, which for the sake of simplicity, is likewise identified by the reference symbol 11 hereinafter. In FIG. 1, the liquid crystal element 11 is arranged between the polarization means 9 and the objective 4 in the illumination beam path 6. The liquid crystal element 11, has an electro-optical component, can be driven electrically by the control device 12, which is only depicted schematically. The control device 12 is connected to an operating element 18. By means of the operating element 18, the operator can vary the contrasting of the polarization interference microscope 1 namely by virtue of the fact that, e.g. through rotation of the rotary switch 19, an operating signal generated by the rotary switch 19 is communicated to the control unit 12, whereby the control unit 12 varies the voltage applied to the liquid crystal element 11. In this respect, the operator indirectly alters the optical property of the liquid crystal element 11 by rotating the rotary switch 19.

The liquid crystal element 11 from FIG. 1 is arranged in the beam path of the polarization interference microscope 1 according to the invention in such a way that the partial beams 13, 14 divided thereby form an angle $\alpha$. The partial beams 13, 14 are in each case linearly polarized, the liquid crystal element 11 being formed and arranged in such a way that their polarization directions are perpendicular to one another. The liquid crystal element 11 is situated in a pupil plane in the illumination beam path 6. The objective 4 converts the angularly split partial beams 13, 14 into partial beams 15, 16 running parallel. It is expressly pointed out that only a partial beam of the total effective beam cross section is shown, namely the illumination light beam which comes from the beam splitter 8 and runs on the optical axis. However, there are further light beams propagating from the polarization means 9 in the direction of the liquid crystal element 11 in the field (that is to say in a region transversely with respect to the optical axis) which are likewise split correspondingly and are not depicted only for the sake of clarity.

A compensation element 17—depicted by dashed lines in FIG. 1—is provided, which can be used optionally in the polarization interference microscope 1. The compensation element 17 is formed in a manner similar to the liquid crystal element 11: it has liquid crystals and therefore likewise has a birefringent property. The compensation element 17 is arranged between the liquid crystal element 11 and the tube lens 3, preferably in the vicinity of the liquid crystal element 11. The compensation element 17 can likewise be driven by the control device 12. This driving could be effected independently of the driving of the liquid crystal element 11 or in a manner dependent on the driving of the liquid crystal element 11. The compensation element 17 makes it possible to vary or compensate for, in particular, the lateral or spatial offset (already mentioned above) produced by the liquid crystal element 11 and/or a dispersion difference is brought about by the liquid crystal element 11—between the two partial beams in the arrangement in accordance with FIG. 1.

Figure 2:
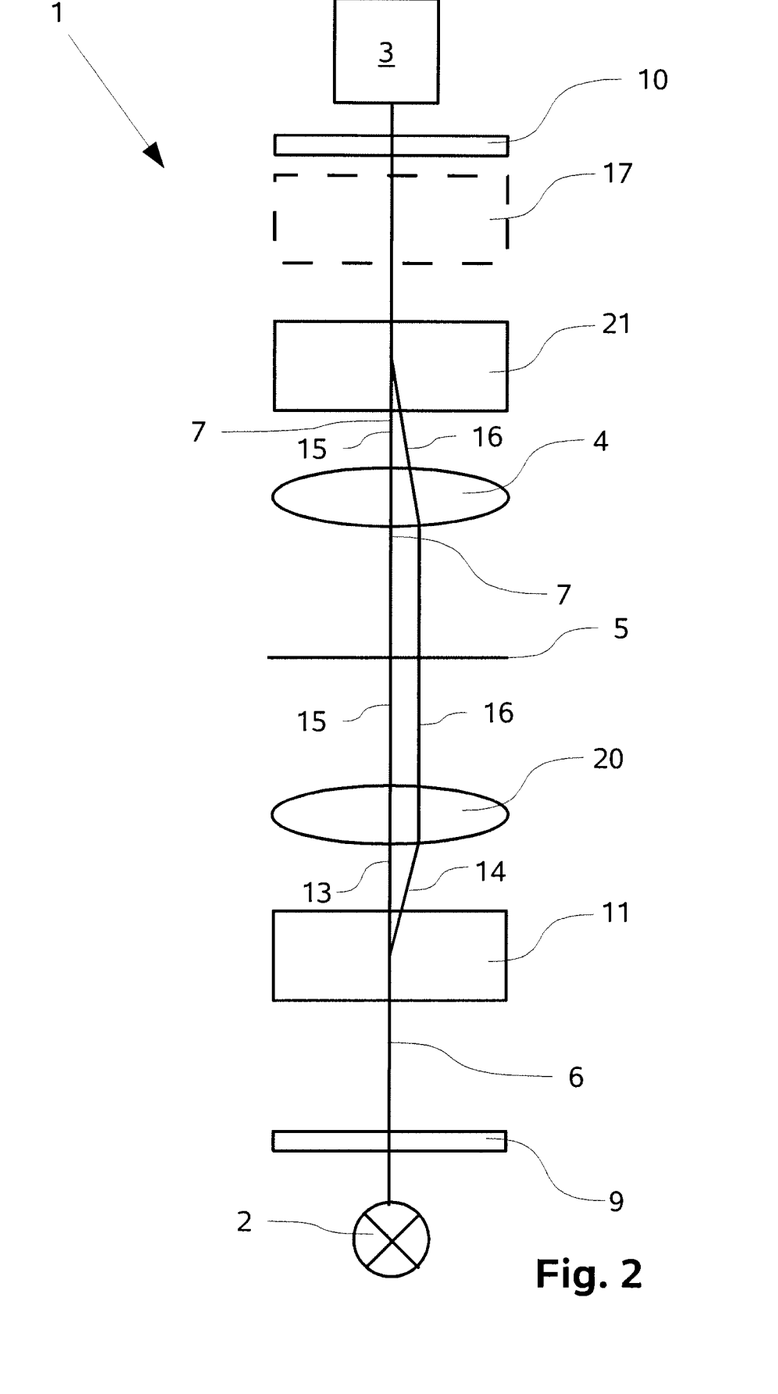
FIG. 2 shows a schematic illustration of a second exemplary embodiment of a polarization interference microscope according to the invention.
Figure 3:
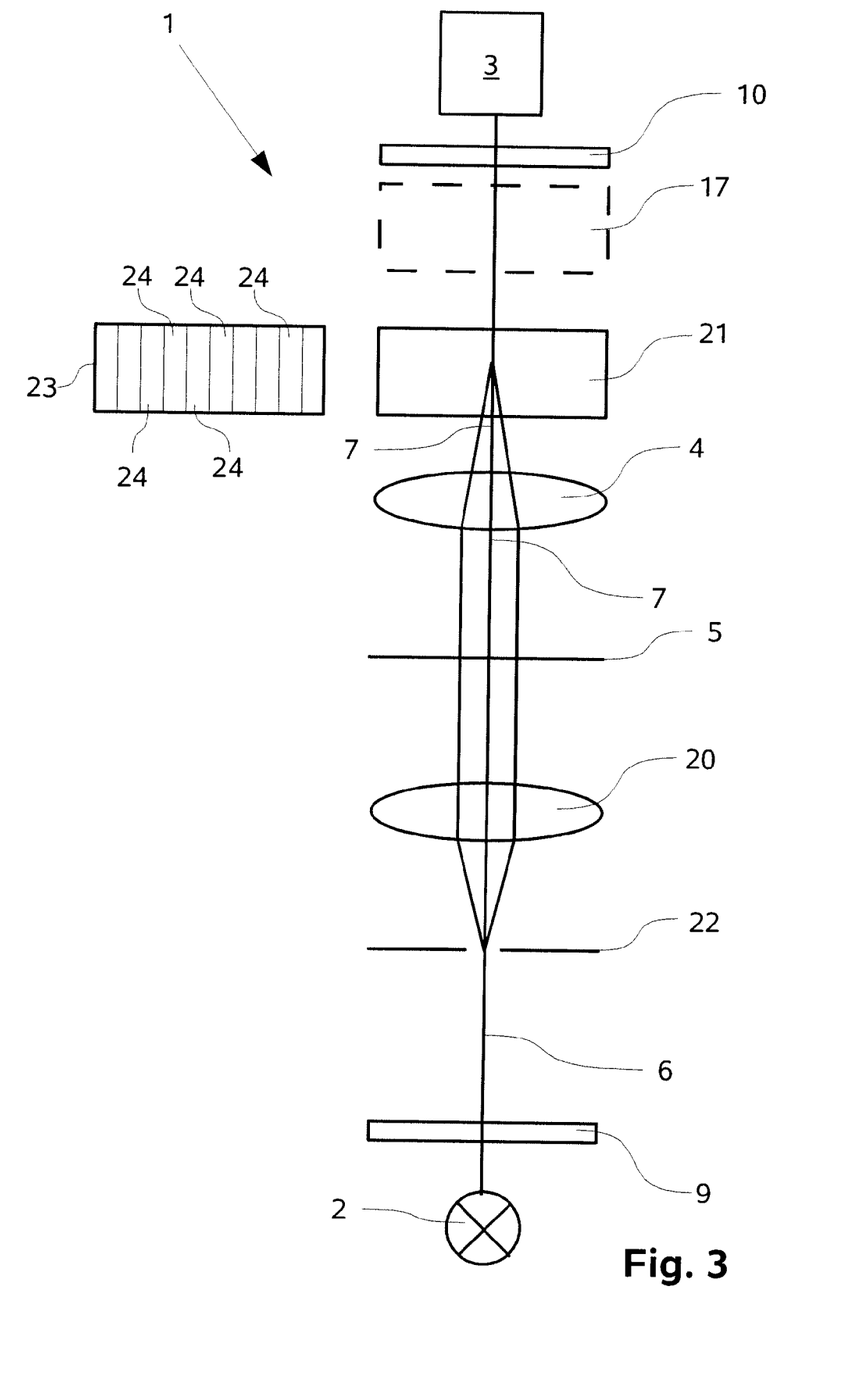
FIG. 3 shows a schematic illustration of a third exemplary embodiment of a polarization interference microscope according to the invention.
Figure 4:
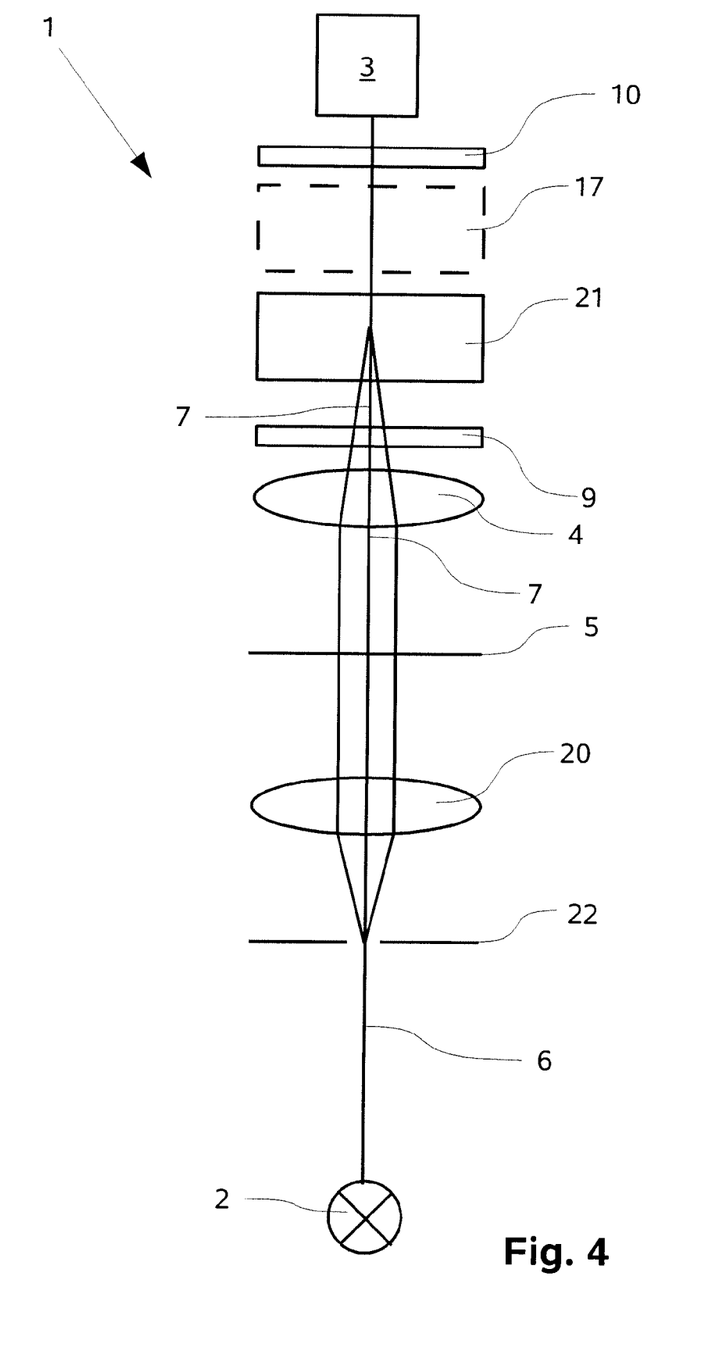
FIG. 4 shows a schematic illustration of a fourth exemplary embodiment of a polarization interference microscope according to the invention.

FIGS. 2 to 4 in each case show a further exemplary embodiment of a polarization interference microscope 1 according to the invention in a transmitted light arrangement.

In the exemplary embodiment from FIG. 2, the light emitted by the light source 2 is linearly polarized by the polarization means 9. The linearly polarized light passes through the liquid crystal element 11 arranged in the illumination beam path 6, where it is likewise split into two partial beams 13, 14. Via the condenser 20, the object 5 is illuminated with the light from the light source 2. The light which passes through the object 5 and is collected by the objective 4 passes through a further liquid crystal element 21 arranged in the imaging beam path 7. The liquid crystal element 11 recombines the two partial beams 13, 14 or 15, 16 split by the first liquid crystal element 11 into a light beam. A compensation element 17 may optionally be arranged in the polarization interference microscope 1 in accordance with the exemplary embodiment from FIG. 2 as well, and can obtain an effect comparable to that of the compensation element 17 in accordance with the exemplary embodiment from FIG. 1. The partial beams recombined by the liquid crystal element 21 and light beams compensated by the compensation element 17 provided, if appropriate, impinge on the analyzer means 10, which (like the polarization means 9 and analyzer means 10 from FIG. 2 as well) has a linear polarization filter. The recombined partial beams interfere at the analyzer means 10 and the oscillation components of these light beams which have an oscillation direction parallel to the orientation of the linear polarization filter can pass through the analyzer means 10 to the tube lens 3 and ultimately to the eye of the operator (not shown in FIG. 2).

FIG. 3 shows a further exemplary embodiment of a polarization interference microscope 1 according to the invention, which has an arrangement of the individual components which is comparable to that shown in FIG. 2. This relates in particular to the light source 2, the polarization means 9, the condenser 20, the position of the object plane 5, the objective 4, the liquid crystal element 21, the optionally provided compensation element 17, the analyzer means 10 and also the tube lens 3. The liquid crystal element 11 arranged between polarization means 9 and condenser 20 in the exemplary embodiment in accordance with FIG. 2 is not provided, however, in the exemplary embodiment in accordance with FIG. 3. A slit diaphragm 22 is arranged between the polarization means 9 and the condenser 20, and can mask out part of the light that is emitted by the light source 2 and passes through the polarization means 9 in the direction of object 5. A lower image brightness and a possibly reduced imaging quality are thereby obtained; fine image details can no longer be represented, under certain circumstances. However, the costs for the liquid crystal element, together with driving, that is not provided in the illumination beam path 6 can be saved in return.

FIG. 3 shows a birefringent optical component 23, which can be introduced to the imaging beam path 7 instead of the liquid crystal element 21 from FIG. 3. The component 23 has a plurality of liquid crystal elements 24 which are arranged individually alongside one another and which can be individually driven independently of one another. The effect of the component 23 is otherwise substantially comparable to that of the liquid crystal element 21 from FIG. 3. In other words, the component 23 can also split light beams into in each case two partial beams that are linearly polarized substantially perpendicular to one another.

The exemplary embodiment of a polarization interference microscope 1 according to the invention as shown in FIG. 4 has a comparable construction to the exemplary embodiment in accordance with FIG. 3. It is merely the case that the polarization means 9 is not arranged in the illumination beam path 6, but rather in the imaging beam path 7, namely between the objective 4 and the liquid crystal element 21. Such an arrangement substantially corresponds, in principle, to that from the polarization interference microscope known from EP 1 359 453 A2. Consequently, with a polarization interference microscope 1 in accordance with FIG. 4, the object 5 is illuminated with non-polarized light from the light source 2. An object 5 is often examined in a plastic petri dish. Such an object carrier made of plastic has birefringent properties. As a result, the birefringent object carrier or all further optical elements in the illumination beam path which likewise have a birefringent and/or anisotropic character may have a disturbing influence on the object image to be generated. Therefore, the polarization means 9 is disposed downstream of the objective 4 in the imaging bema path 7, with the result that the light coming from the object 5 is linearly polarized only starting from this location. The effect of the liquid crystal element 21, of the optional compensation element 17 and of the analyzer means 10 of the exemplary embodiment in accordance with FIG. 4 is comparable to the corresponding components of the exemplary embodiment from FIG. 3.

Figure 5:
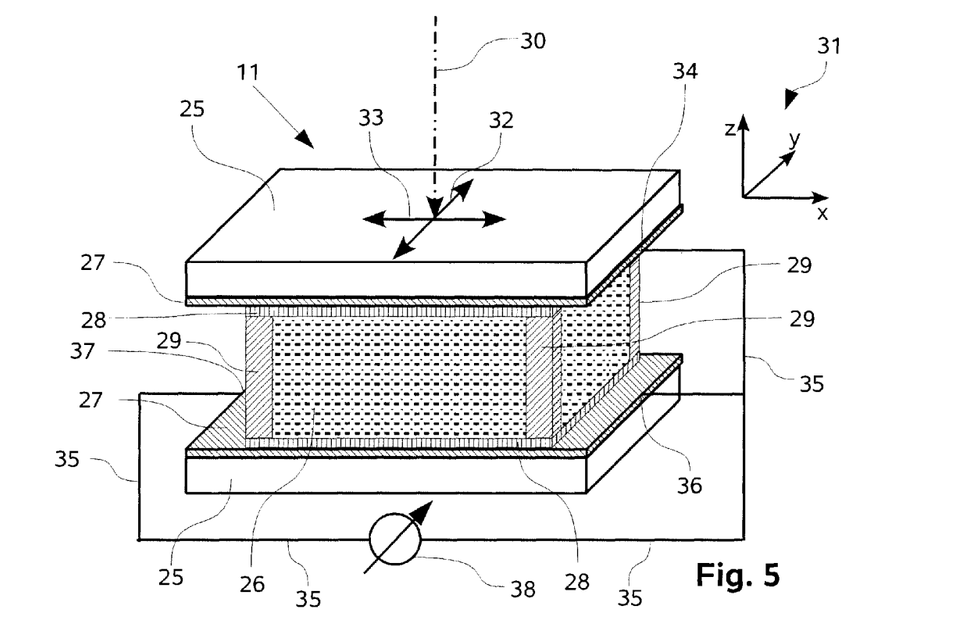
FIG. 5 shows a schematic illustration of one exemplary embodiment of a liquid crystal element.

FIG. 5 shows, in a perspective schematic illustration, a liquid crystal element 11 which can be used as liquid crystal element 11 or 21 in the polarization interference microscope 1 according to the invention in accordance with FIGS. 1 to 4. The liquid crystal element 11 comprises two glass plates 25 which are arranged substantially parallel to one another and between which the liquid crystals are arranged, the liquid crystals being identified by the reference symbol 26. An electrode embodied in the form of an ITO layer 27 is in each case provided between a glass plate 25 and the liquid crystals 26, said electrode being formed in electrically conductive and optically transparent fashion. A polyimide layer 28 is provided between an ITO layer 27 and the liquid crystals 26, said polyimide layer bringing about a preorientation of the liquid crystals 26. Specifically, the polyimide layer 28 has fine linear depressions—not shown—which can be produced by simple mechanical machining during the production of the liquid crystal element 11, for example by sweeping over the polyimide layer 28 with a suitable cloth. Spacers 29 are provided at four edges of the substantially parallelepipedal volume from which the liquid crystals 26 are arranged but only three of said spacers are visible on account of the perspective illustration from FIG. 5.

The liquid crystal element 11 is arranged in a beam path in such a way that the optical axis 30 of the respective beam path (illumination beam path and/or imaging beam path) is oriented perpendicular to the surface of the glass plate 25. In this respect, the optical axis 30 has a direction oriented parallel to the Z coordinate of the schematically indicated system 31 of coordinates. The two double-headed arrows 32, 33 indicate the optical axes of the liquid crystal element 11 or the polarization components—which can be produced thereby—of the partial beams split by the liquid crystal element 11. In this case, double-headed arrow 32 identifies the ordinary polarization oriented parallel to the Y direction of the system 31 of coordinates. In this case, double-headed arrow 33 identifies the extraordinary polarization oriented parallel to the X-direction of the system 31 of coordinates. The two polarization directions 32, 33 are correspondingly perpendicular to one another. The liquid crystal element 11 is then illuminated with linearly polarized light from above (as indicated by the arrow tip of the optical axis 30), the polarization direction of the linearly polarized light being at an angle of 45 degrees relative to the X direction of the system 31 of coordinates. The polarization direction of the linearly polarized light is oriented parallel to the angle bisector of the optical axes 32, 33 of the liquid crystal element 11. The light impinging on the liquid crystal element 11 is therefore split, upon passing through the liquid crystal element 1, into two partial beams of substantially identical intensity portions.

Both the upper and the lower ITO layer 27 can be electrically contact-connected. Thus, the upper ITO layer 27 is contact-connected at the contact location 34 by means of an electrical line 35. The lower ITO layer 27 can be electrically contact-connected both at a first contact location 36 and at a second contact location 37 likewise by means of an electrical line 35. The two contact locations 36, 37 are arranged on opposite sides of the liquid crystal element 11. The upper ITO layer 27 has a low nonreactive resistance. The lower ITO layer 27 by contrast, has a high nonreactive resistance. A constant potential is correspondingly formed upon application of a predeterminable DC voltage with the voltage source 38 at the upper ITO layer 27. A potential drop forms across the lower ITO layer 27, on account of its high nonreactive resistance, along the connecting direction between the two contact locations 36, 37 or in the X direction. In this case, the lower ITO layer 27 or the contact locations 36, 37 are formed in such a way that a potential drop having a directly proportional or linear dependence on the spatial coordinate in the X direction is present along the X direction, and at a substantially constant potential profile is present along the Y direction. This correspondingly results between the upper and the lower ITO layer 27, in an electric field in which the electric field strength changes in the X direction, while the electric field strength in the Y direction is substantially constant. In the case of a predetermined electric field strength or in the case of a voltage applied to the ITO layers 27, a deflection force dependent on the spatial coordinate in the X direction correspondingly acts on the liquid crystals 26. In this case, the liquid crystals 26 are deflected from their rest position on account of the potential difference to be precise to a greater extent, the larger the potential difference between the upper and the lower ITO layer 27. Consequently, there is a change in the refractive index for the X polarization component along the X direction and a light beam having this polarization direction experiences an angular deflection in the X direction and depending on the spatial coordinate at which the light beam passes through the liquid crystal element 11. In principle, it holds true that the further the liquid crystals 26 are deflected from their rest position, the greater the change in the refractive index for the corresponding polarization component, here for the extraordinary polarization in the X direction.

The refractive index for the ordinary polarization in the Y direction is constant over the entire liquid crystal element 11. This component correspondingly experiences a predeterminable, but constant phase delay. As a result, therefore, the linearly polarized light beams having a polarization direction at an angle of 45 degrees with respect to the X direction are split into in each case two partial beams that are polarized perpendicular to one another, the respective partial beams diverging at an angle dependent on the voltage profile present between the two ends of the lower ITO layer 27 and the electric field established from this between the two ITO layers 27. Given predetermined nonreactive resistances of the two ITO layers 27, it is possible, with the controllable voltage source 28, to set a predeterminable potential difference with in each case different offset values.

An ITO layer 27 may very generally have, along a first and/or a second spatial direction, a linear or some other analytical nonreactive resistance profile, for example as a result of in each case a contact-connection formed in punctiform, linear or ring-shaped fashion in conjunction with a corresponding resistance property of the respective electrode.

Figure 6:
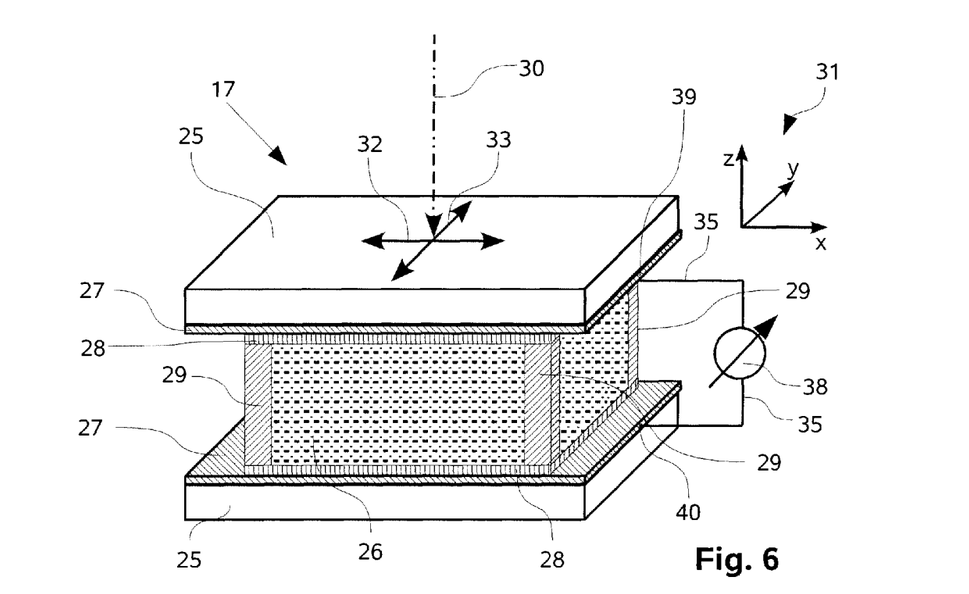
FIG. 6 shows a schematic illustration of one exemplary embodiment of a compensation element.

FIG. 6 shows, in a perspective schematic illustration, a compensation element 17 which can optionally be used in the polarization interference microscope 1 according to the invention in accordance with FIGS. 1 to 4. The compensation element 17 is constructed in a manner substantially comparable to the liquid crystal element 11 from FIG. 5. The individual parts of the compensation element 17 are correspondingly identified by the same reference symbols as the individual parts of the liquid crystal element 11 from FIG. 5. In the exemplary embodiment in accordance with FIG. 6 it differs from the liquid crystal element 11 from FIG. 5 on the one hand by virtue of the fact that both ITO layers 27 in each case have a relatively low nonreactive resistance. They differ on the other hand by virtue of the electrical contact-connection; a contact location 39 is provided at the upper ITO layer 27 and only one contact location 40 is provided at the lower ITO layer 27. A substantially constant voltage profile or a substantially constant electric field is correspondingly formed in the case of an electrical voltage settable by the voltage source 38 in both spatial directions X and Y. The phase differences of the respective partial beams, that is to say of the ordinary and extraordinary partial beams, are correspondingly influenced in the same way by means of the compensation element 17. The arrangement of the ITO layers 27 thus acts like a capacitor.

The compensation element 17 is then expediently—but not necessarily—arranged relative to the liquid crystal element 11 in such a way that the extraordinary polarization direction thereof is oriented in the Y direction, and that the ordinary polarization direction is oriented in the X direction. In other words, the compensation element 17 is arranged in the beam path of a polarization interference microscope 1 according to the invention in a manner rotated about the optical axis 30 by 90 degrees relative to the liquid crystal element 11 with regard to its birefringent properties.

A predeterminable voltage is then preferably applied to the compensation element 17 in such a way that this results in the minimization or vanishing of the phase difference of the polarization components in the X and Y directions of partial beams (recombined downstream of the liquid crystal element 11) for the light beams which run on or near the optical axis 30 or through the center of the two elements, that is to say the liquid crystal element 11 and the compensation element 17.

The compensation element 17, if it is correspondingly arranged in the optical beam path, can therefore bring about, on the one hand, the vanishing of the phase difference between the partial beams of the two mutually perpendicular polarization components for a beam along the optical axis after passage through the liquid crystal element 11 and the compensation element 17. As a result, these two partial beams can optimally interfere with one another in the image center. On the other hand, dispersion effects caused by the liquid crystals 26 of the liquid crystal element 11 during the birefringence can be virtually completely compensated for. The dispersion effects are caused by the fact that the difference in refractive index between the ordinary and the extraordinary polarization component of the birefringent component varies with the wavelength of the light. The phase difference between one polarization component and the polarization component arranged perpendicular thereto downstream of the liquid crystal element 11 would therefore vary with the wavelength. In conjunction with a compensation element 17 disclosed downstream of the liquid crystal element 11, however, it emerges that both beams cover the same optical path length as ordinary beam and as extraordinary beam, whereby the phase difference between one and the other polarization component vanishes for all wavelengths.

Figure 7A:
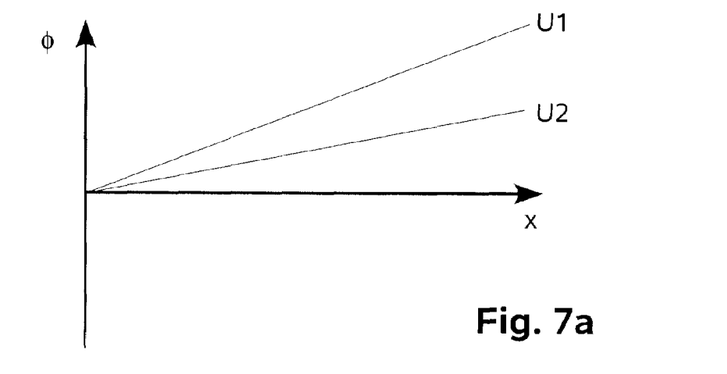
FIGS. 7a-7c show in each case in a schematic diagram the phase difference or phase deviation $\phi$ that can be obtained with a variably settable birefringent optical component as a function of the X coordinate for two different voltages.
Figure 7B:
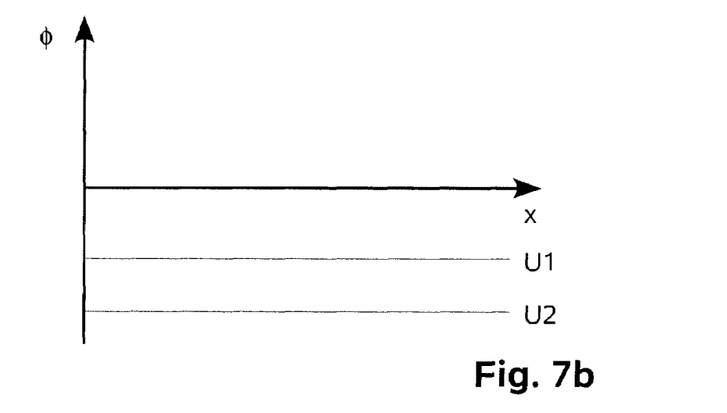
Figure 7C:
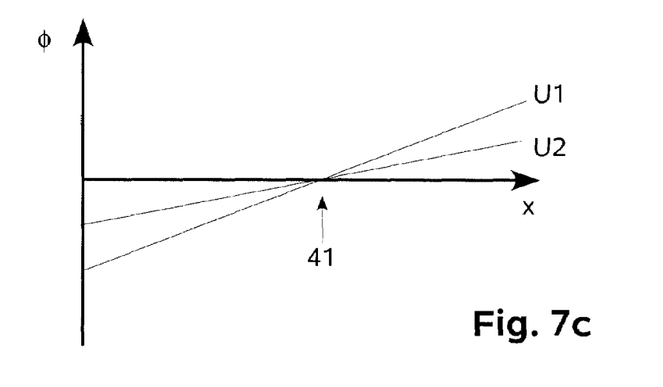

In the diagrams shown in FIGS. 7a to 7c, the phase difference or phase deviation φ that can be obtained with a birefringent optical component that is settable in a variable manner is plotted as a function of the X coordinate. U1 was chosen to be greater than U2 in this case. In the diagram in accordance with FIG. 7a, the phase difference that can be obtained with the liquid crystal element 11 in accordance with FIG. 5 is plotted as a function of the X coordinate for two different voltages U1 and U2. According to the voltage—varying in the X direction—of the liquid crystal element 11 from FIG. 5 (see corresponding part of the description further above), the two partial beams split by the liquid crystal element 11 have no phase difference at the X coordinate zero. The phase difference between the two partial beams rises linearly as the X coordinate increases.

In the diagram in accordance with FIG. 7b, the phase difference that can be obtained with the compensation element 17 in accordance with FIG. 6 is plotted as a function of the X coordinate for two different voltages U1 and U2. Accordingly, with the compensation element 17, a substantially constant phase difference is impressed on all the partial beams independently of the X coordinate. In other words, a constant offset is impressed with regard to the phase difference of the light beams passing through the compensation element 17.

In the diagram in accordance with FIG. 7c, the phase difference of the partial beams which have passed through both the liquid crystal element 11 and the compensation element 17 given the respective voltage settings in accordance with the diagrams of the FIGS. 7a and 7b is plotted as a function of the X coordinate. The phase differences between the respective partial beams have a value of zero in the central region—identified by the arrow 41—of the respective component 11, 17. The phase difference correspondingly vanishes for light beams which run in the central region 41 or near the optical axis 30, so that in particular these light beams and, consequently, the object field center can optimally interfere with one anther and, consequently, can produce an optimum contrast. In the diagrams in accordance with FIGS. 7a and 7b, the phase differences associated in each case with two different voltages are depicted in order to make it clear that with a polarization interference microscope according to the invention it is possible to produce a variable phase difference and, consequently, it is possible to realize a variable interference contrast. The latter may, of course, assume many further values that are not represented in FIGS. 7a to 7c.

The liquid crystal elements 11, 21, 23 and/or the compensation elements 17 which are shown in FIGS. 2 to 4 can likewise be varied and driven by means of a control device (not shown in said figures) in a manner comparable to the arrangement in accordance with FIG. 1.

Finally, it should especially be pointed out that the exemplary embodiments discussed above serve only for describing the claimed teaching, but do not restrict the latter to the exemplary embodiments.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

LIST OF REFERENCE SYMBOLS

1 Polarization interference microscope
2 Light source
3 Tube lens
4 Objective
5 Object plane or object
6 Illumination beam path
7 Imaging beam path
8 Beam splitter
9 Polarization means
   Analyzer means
   Liquid crystal element, birefringent optical component
   Control device for (12)
13-16 Partial beam
   Compensation element
   Operating element
   Rotary switch of (18)
   Condenser
   Liquid crystal element
   Slit diaphragm
   birefringent optical component
   Liquid crystal elements of (23)
   Glass plate of (11), (21) and (17)
   Liquid crystals
   ITO layer of (11), (21) and (17)
   Polyimide layer of (11), (21) and (17)
   Spacer of (11), (21) and (17)
   Optical axis, incident light beam
   System of coordinates
   Ordinary polarization direction
   Extraordinary polarization direction
   Contact location of the upper ITO layer (27) of (11)
   Electrical line
   First contact location of the lower ITO layer (27) of (11)
   Second contact location of the lower ITO layer (27) of (11)
   Voltage source
   Contact location of the upper ITO layer of (17)
   Contact location of the lower ITO layer of (17)
   Central region
φ The phase difference that can be produced by (11, 21, 23, 17)
α Angle between (13) and (14)

What is claimed is:

1. A polarization interference microscope for imaging objects, comprising a light source, an illumination beam path, an imaging beam path and an objective, wherein the illumination beam path extends from the light source to the object, wherein the imaging beam path extends from the object to a detector or a tube, wherein at least one polarization means is provided in the illumination beam path and/or in the imaging beam path, by which at least one polarization means the light of the respective beam path can be converted into a predeterminable polarization state, wherein an analyzer means is provided in the imaging beam path, and wherein a birefringent component is provided between the polarization means and the analyzer means by which birefringent component the light polarized by the polarization means can be divided into two partial beams having different polarization directions and by which birefringent component a splitting between the two partial beams can be produced, wherein the component has a liquid crystal element formed in such a way that the splitting between the two partial beams is settable in a variable manner thereby.

2. The polarization interference microscope as claimed in claim 1, wherein the liquid crystal element is settable in a variable manner on the basis of magneto-optical or electro-optical properties.

3. The polarization interference microscope as claimed in claim 1, wherein the liquid crystal element is arranged in the beam path and/or formed in such a way that the partial beams separated by the liquid crystal element form an angle, and wherein the liquid crystal element is preferably arranged in a pupil plane in the beam path.

4. The polarization interference microscope as claimed in claim 1, wherein the liquid crystal element is arranged in the beam path and/or formed in such a way that the partial beams separated by the liquid crystal element have a parallel offset, and wherein the liquid crystal element is preferably arranged in an intermediate image plane in the beam path.

5. The polarization interference microscope as claimed in claim 1, wherein the polarization directions of the partial beams separated by the liquid crystal element are oriented substantially perpendicular to one another.

6. The polarization interference microscope as claimed in claim 1, wherein the polarization means and the liquid crystal element are arranged relative to one another in the beam path in such a way that the oscillation direction of the light polarized by the polarization means is oriented substantially parallel to the angle bisector of the polarization directions of the partial beams that can be generated by the liquid crystal element.

7. The polarization interference microscope as claimed in claim 1, wherein the liquid crystal element has a substantially parallelepipedal or cylindrical volume arranged between two glass plates in which volume liquid crystals are provided.

8. The polarization interference microscope as claimed in claim 7, wherein an electrode is provided between one glass plate and the liquid crystal volume, and wherein a further electrode is provided between the other glass plate and the liquid crystal volume, wherein the electrode has an optically transparent electrically conductive layer, preferably an ITO layer (indium, tin, oxide).

9. The polarization interference microscope as claimed in claim 1, wherein at least one ITO layer can be electrically contact-connected, and/or wherein an ITO layer has an electrical resistance that may be low or very high.

10. The polarization interference microscope as claimed in claim 1, wherein, between an ITO layer and the liquid crystal volume, a layer is provided by which a preorientation of the liquid crystals can be produced, and wherein the layer preferably has polyimide.

11. The polarization interference microscope as claimed in claim 1, wherein a plurality of liquid crystal elements which are arranged one alongside another or one behind another and can be driven in each case independently of one another are provided.

12. The polarization interference microscope as claimed in claim 1, wherein the phase difference that can be produced by the liquid crystal element is substantially constant over its entire cross-sectional area effective in the beam path.

13. The polarization interference microscope as claimed in claim 1, wherein the phase difference that can be produced by the liquid crystal element has values which are different in a predeterminable manner depending on the spatial coordinate (X, Y) of the cross-sectional area effective in the beam path.

14. The polarization interference microscope as claimed in claim 13, wherein the values of the phase difference that can be produced by the liquid crystal element depend, at least along one direction, proportionally on the spatial coordinate (X) of the cross-sectional area effective in the beam path.

15. The polarization interference microscope as claimed in claim 1, wherein the polarization means is arranged in the illumination beam path between the light source and the objective and preferably has a linear or circular polarization filter.

16. The polarization interference microscope as claimed in claim 1, wherein the polarization means is arranged in the imaging beam path between the objective and the liquid crystal element and preferably has a linear or circular polarization filter.

17. The polarization interference microscope as claimed in claim 1, wherein the analyzer means is arranged in the imaging beam path between the objective and a detector and/or a tube and preferably has a linear or circular polarization filter.

18. The polarization interference microscope as claimed in claim 1, wherein the liquid crystal element is arranged in the illumination beam path between the polarization means and the objective, or wherein the liquid crystal element is arranged in the illumination beam path between the polarization means and a condenser.

19. The polarization interference microscope as claimed in claim 1, wherein the liquid crystal element is arranged in the imaging beam path between the objective and the analyzer means.

20. The polarization interference microscope as claimed in claim 1, wherein a liquid crystal element is arranged in the illumination beam path, and wherein a further liquid crystal element is arranged in the imaging beam path.

21. The polarization interference microscope as claimed in claim 1, wherein a compensation element having a birefringent property is provided, which may have liquid crystals and which is arranged and can be operated in the beam path of the polarization interference microscope in such a way that an offset can be produced by the compensation element with regard to the phase difference of the partial beams, and/or that a dispersion difference between the partial beams that is brought about by the liquid crystal element can be largely compensated for by the compensation element.

22. The polarization interference microscope as claimed in claim 21, wherein the compensation element is formed in such a way that the phase difference—produced by the compensation element—between two partial beams on the optical axis can be minimized or has a value of zero.

23. The polarization interference microscope as claimed in claim 21, wherein the compensation element is settable in a variable manner on the basis of magneto-optical or electro-optical properties.

24. The polarization interference microscope as claimed in claim 21, wherein the phase difference that can be produced by the compensation element is substantially constant over its entire cross-sectional area effective in the beam path, or wherein the phase difference that can be produced by the compensation element has values which are different in a predeterminable manner depending on the spatial coordinate of the cross-sectional area effective in the beam path.

25. The polarization interference microscope as claimed in claim 21, wherein the compensation element is arranged between the liquid crystal element and the analyzer means.

26. The polarization interference microscope as claimed in claim 21, wherein the compensation element is arranged at any desired location between the polarization means and the analyzer means.

27. The polarization interference microscope as claimed in claim 21, wherein the compensation element is arranged relative to the liquid crystal element in the beam path in such a way that the ordinary axis of the compensation element is at a predeterminable angle with respect to the ordinary axis of the liquid crystal element, said angle preferably being 90 degrees.

28. The polarization interference microscope as claimed in claim 1, featuring a reflected light illumination beam path and/or a bright field illumination of the object.

29. The polarization interference microscope as claimed in claim 1, featuring a transmitted light illumination beam path, and wherein a slit diaphragm is preferably arranged in the illumination beam path.

30. The polarization interference microscope as claimed in claim 1, featuring a wide field imaging.

31. A retrofit kit for a microscope, having a polarization means, an analyzer means, a liquid crystal element and, if appropriate, a compensation element, wherein the polarization means, the analyzer means, the liquid crystal element and, if appropriate, the compensation element can be introduced into the beam path of the microscope in such a way that a polarization interference microscope as claimed in claim 1 can be formed as a result.

32. A retrofit kit for a conventional polarization interference microscope, having a liquid crystal element and, if appropriate, a compensation element wherein the liquid crystal element and, if appropriate, the compensation element can be introduced, instead of at least one wollaston prism of the conventional polarization interference microscope, into the beam path of the microscope in such a way that a polarization interference microscope as claimed in claim 1 can be formed as a result.

33. A method for imaging objects with a polarization interference microscope, in particular with a polarization interference microscope as claimed in claim 1, wherein the polarization interference microscope has a light source, an illumination beam path, an imaging beam path and an objective, wherein the illumination beam path extends from the light source to the object, wherein the imaging beam path extends from the object to a detector or a tube, wherein at least one polarization means arranged in the illumination beam path and/or in the imaging beam path converts the light of the respective beam path into a predeterminable polarization state, wherein an analyzer means is provided in the imaging beam path, and wherein a birefringent component is provided between the polarization means and the analyzer means by which birefringent component the light polarized by the polarization means is divided into two partial beams having different polarization directions and by which birefringent component a splitting between the two partial beams is produced, wherein the component has a liquid crystal element formed in such a way that the splitting between the two partial beams can be set in a variable manner thereby.

* * * * *